(12) United States Patent
Liu (10) Patent No.: US 10,595,642 B2
(45) Date of Patent: Mar. 24, 2020

(54) LIFTING DEVICE FOR HEADREST

(71) Applicant: Dongguan Weihong Hardware and Plastic Products Co., Ltd., Dongguan (CN)

(72) Inventor: Jianhua Liu, Dongguan (CN)

(73) Assignee: DONGGUAN WEIHONG HARDWARE AND PLASTIC PRODUCTS CO., LTD., Dongguan (CN)

( * ) Notice: Subject to any disclaimer, the term of this patent is extended or adjusted under 35 U.S.C. 154(b) by 0 days.

(21) Appl. No.: 16/184,280

(22) Filed: Nov. 8, 2018

(65) Prior Publication Data
US 2019/0069682 A1 Mar. 7, 2019

(51) Int. Cl.
| | |
|---|---|
| B60N 2/80 | (2018.01) |
| A47C 17/04 | (2006.01) |
| A47C 20/04 | (2006.01) |
| A47C 7/38 | (2006.01) |
| B60N 2/809 | (2018.01) |
| B60N 2/829 | (2018.01) |

(52) U.S. Cl.
CPC ............. *A47C 17/04* (2013.01); *A47C 7/38* (2013.01); *A47C 20/04* (2013.01); *A47C 20/041* (2013.01); *B60N 2/809* (2018.02); *B60N 2/829* (2018.02)

(58) Field of Classification Search
CPC .................................. B60N 2/809; B60N 2/829
See application file for complete search history.

(56) References Cited

U.S. PATENT DOCUMENTS

| | | | | |
|---|---|---|---|---|
| 5,288,129 | A * | 2/1994 | Nemoto ................. | B60N 2/829 297/410 |
| 7,543,888 | B2 * | 6/2009 | Kuno ................... | B60N 2/0232 297/353 |
| 8,272,696 | B2 * | 9/2012 | Hong ..................... | B60N 2/829 297/410 |
| 2005/0231018 | A1* | 10/2005 | Mori ........................ | B60N 2/06 297/410 |

(Continued)

FOREIGN PATENT DOCUMENTS

| | | | | |
|---|---|---|---|---|
| DE | 2953749 C2 * | 9/1988 | ............. | B60N 2/829 |
| DE | 19951967 A1 * | 5/2001 | ............. | B60N 2/888 |

(Continued)

*Primary Examiner* — Timothy J Brindley
(74) *Attorney, Agent, or Firm* — Shimokaji IP (57) ABSTRACT

A lifting device for headrest includes a fixing frame, a driving rod, two headrest supports, a driving device fixed on the fixing frame, and two lifting mechanisms configured on the fixing frame and located at two sides of the driving device. Each lifting device includes a reversing driving assembly, a guide rod and a slider moveably connected on the guide rod, the two headrest supports are mounted on the sliders, respectively, the driving rod passes through and is driven by the driving device, two ends of the driving rod are connected with the reversing driving assemblies, respectively, and the slider is driven by the reversing driving assembly. Both sliders on the two lifting mechanisms have driving forces so as to improve balance at both sides and make the support force stronger. The headrest is kept in a stable status, thereby preventing damage of the lifting device and the sofa.

10 Claims, 7 Drawing Sheets

(56) References Cited

U.S. PATENT DOCUMENTS

| | | | | |
|---|---|---|---|---|
| 2006/0103216 A1* | 5/2006 | Hoekstra | ............... | B60N 2/832 |
| | | | | 297/410 |
| 2008/0315653 A1* | 12/2008 | Brunner | ............... | B60N 2/832 |
| | | | | 297/362 |
| 2012/0013155 A1* | 1/2012 | Hwang | ............... | B60N 2/002 |
| | | | | 297/216.12 |
| 2012/0025582 A1* | 2/2012 | Humer | ............... | B60N 2/821 |
| | | | | 297/391 |
| 2014/0035337 A1* | 2/2014 | Jarry | ............... | B60N 2/0232 |
| | | | | 297/344.1 |
| 2019/0315256 A1* | 10/2019 | Maloney | ............... | B60N 2/829 |

FOREIGN PATENT DOCUMENTS

| | | | | |
|---|---|---|---|---|
| DE | 10014989 A1 * | 9/2001 | ............ | B60N 2/067 |
| EP | 2698277 A1 * | 2/2014 | ............ | B60N 2/821 |

\* cited by examiner

LIFTING DEVICE FOR HEADREST

RELATED APPLICATIONS

This application claims the benefit of priority to Chinese Patent Application No. 201810843690.5 filed in Jul. 27, 2018, which is hereby incorporated by reference in its entirety.

FIELD OF THE INVENTION

The present invention relates to a field of furniture parts, more particularly to a lifting device for a sofa headrest.

BACKGROUND OF THE INVENTION

Chinese Utility Model Application No. 201420867174.3 discloses a headrest adjusting support which includes two linkage assemblies and a linear driving device located between the linkage assemblies. An output end of the linear driving device is connected with the linkage assemblies via a driving rod, so that a fastener of the linkage assembly is driven to rotate by means of linear reciprocating motion, thereby the height and the angle of the headrest can be adjusted.

However, the headrest adjusting support has some drawbacks. For example, the linear driving device is located in the middle, the linkage assemblies at both sides are driven only by the driving rod, thus the balance of the support is poor, and the support force is not strong. In actual operation, since the width of the headrest is big, and sitting position of user is not fixed, thus loading forces at two sides of the headrest are different, which causes one linkage assembly endure a larger loading force, while the other linkage assembly endure a smaller loading force. Furthermore, the driving rod at the middle cannot balance them, as a result, the movement ranges of both linkage assemblies are different, which causes the headrest deflect, even generates damages on the sofa structure.

Thus it's necessary to provide an improved lifting device for headrest which has better balance.

SUMMARY OF THE INVENTION

One objective of the present invention is to provide a lifting device for a headrest which has improved balance.

To achieve the above objective, a lifting device for headrest of the present invention includes a fixing frame, a driving rod, two headrest supports, a driving device fixed on the fixing frame, and two lifting mechanisms configured on the fixing frame and located at two sides of the driving device. Each lifting device comprises a reversing driving assembly, a guide rod and a slider moveably connected on the guide rod, the two headrest supports are mounted on the sliders, respectively, the driving rod passes through the driving device and is driven by the driving device, two ends of the driving rod are connected with the reversing driving assemblies, respectively, and the slider is driven by the reversing driving assembly to slide on the guide rod.

In comparison with the prior art, since the lifting mechanisms are configured at two sides of the driving device, the driving rod driven by the driving device is connected with the reversing driving assembly, and the slider installed with the headrest support is movably connected on the guide rod, thus the driving force from the driving device can be transferred to the reversing driving assembly by means of the driving rod, causing the slider to slide up and down along the guide rod. Differing from the prior art that uses a driving rod to actuate two linkage assemblies, the lifting device for headrest in the present invention uses the driving rod and the reversing driving assembly to transfer the driving force from the middle driving device to the two lifting mechanisms, so that both sliders on the two lifting mechanisms have driving forces to improve balance at both sides and make the support force stronger. Particularly, the two sliders at both sides can maintain the same movement even if the loading forces at both sides of the headrest are different, that is, the headrest is kept in a stable status, thereby preventing damage of the lifting device and the sofa.

Preferably, the driving device comprises an electric motor and a gear box, and the driving rod passes through the gear box and is connected with the gear box.

Preferably, a cross section of the driving rod is polygonal.

Preferably, the lifting mechanism further comprises a shell fixed on the fixing frame, the guide rod is fixed on the shell, the reversing driving assembly is configured in the shell and the guide rod, and an end of the driving rod is inserted into the shell Preferably, the reversing driving assembly comprises a screw rod positioned in the guide rod and a gear group connected between the driving rod and the screw rod, and the slider is connected with the screw rod.

Preferably, the gear group comprises two conical gears engaging with each other, and the two conical gears are fixed to the driving rod and the screw rod respectively.

Preferably, an inserting slot is provided on the slider, by which a lower end of the headrest support is detachably inserted into the inserting slot.

Preferably, a ring groove is provided on the lower end of the headrest support, and a spring is provided at the slider and received in the ring groove.

Preferably, the lifting device further includes two guide screw bushings configured at two ends of the fixing frame respectively, and the two headrest supports passes through the two guide screw bushings.

Preferably, a headrest hinge is fixed on the headrest support, and the headrest hinge comprises a fixing part connected with the headrest support and a swinging arm connected with the fixing part.

BRIEF DESCRIPTION OF THE DRAWINGS

The accompanying drawings facilitate an understanding of the various embodiments of this invention. In such drawings.

DETAILED DESCRIPTION OF ILLUSTRATED EMBODIMENTS

For further understanding the features, technical solutions, purposes and functions of the present invention, and explaining the advantages and spirits of the invention, detailed descriptions for embodiments follow.

Figure 1:
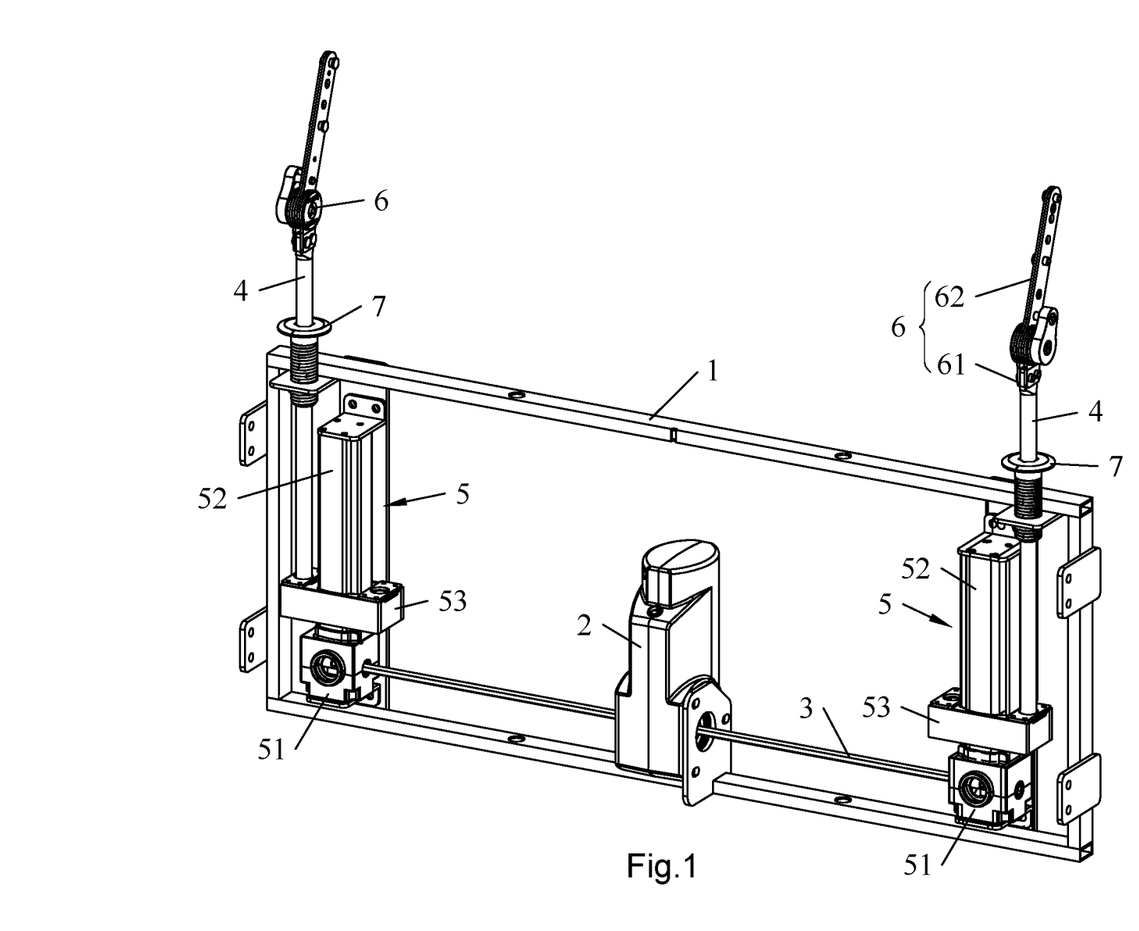
FIG. 1 is a perspective view of a lifting device for headrest according to an embodiment of the present invention.

As shown in FIG. 1, a lifting device for headrest according to the present invention is installed within a sofa body to connect with a sofa headrest, thereby adjusting the height of the headrest. The lifting device for headrest includes a fixing frame 1, a driving device 2, a driving rod 3, two headrest supports 4, and two lifting mechanisms 5.

Specifically, the fixing frame 1 is the structure basis of the whole lifting device. In this embodiment, the fixing frame 1 is a rectangular frame. The driving device 2 is an actuator of the lifting device for headrest, which is fixed on the middle position of the fixing frame 1. The two lifting mechanisms 5 are connected at two ends of the fixing frame 1, namely located at two sides of the driving device 2. The driving rod 3 has a non-circular cross section, and the driving rod 3 passes through the driving device 2 and is driven by the driving device 2; two ends of the driving rod 3 are connected with the two lifting devices 5 respectively, so that the driving force from the driving device 2 can be transferred to the lifting mechanisms 5. Each lifting mechanism 5 includes a shell 51 fixed on the fixing frame 1, a guide rod 52 fixed on the shell 51, a slider 53 moveably connected on the guide rod 52, and a reversing driving assembly configured in the shell 51 and the guide rod 52 and connected with the slider 53. Specifically, the end of the driving rod 3 is connected with the reversing driving assembly, thus when the driving rod 3 rotates, the slider 53 will be driven to slide on the guide rod 52 by means of the reversing driving assembly. The two headrest supports 4 are mounted on the two sliders 53 respectively, and a headrest is mounted on the headrest supports 4, when the slider 53 moves up and down, the height and position of the headrest can be adjusted.

Figure 2:
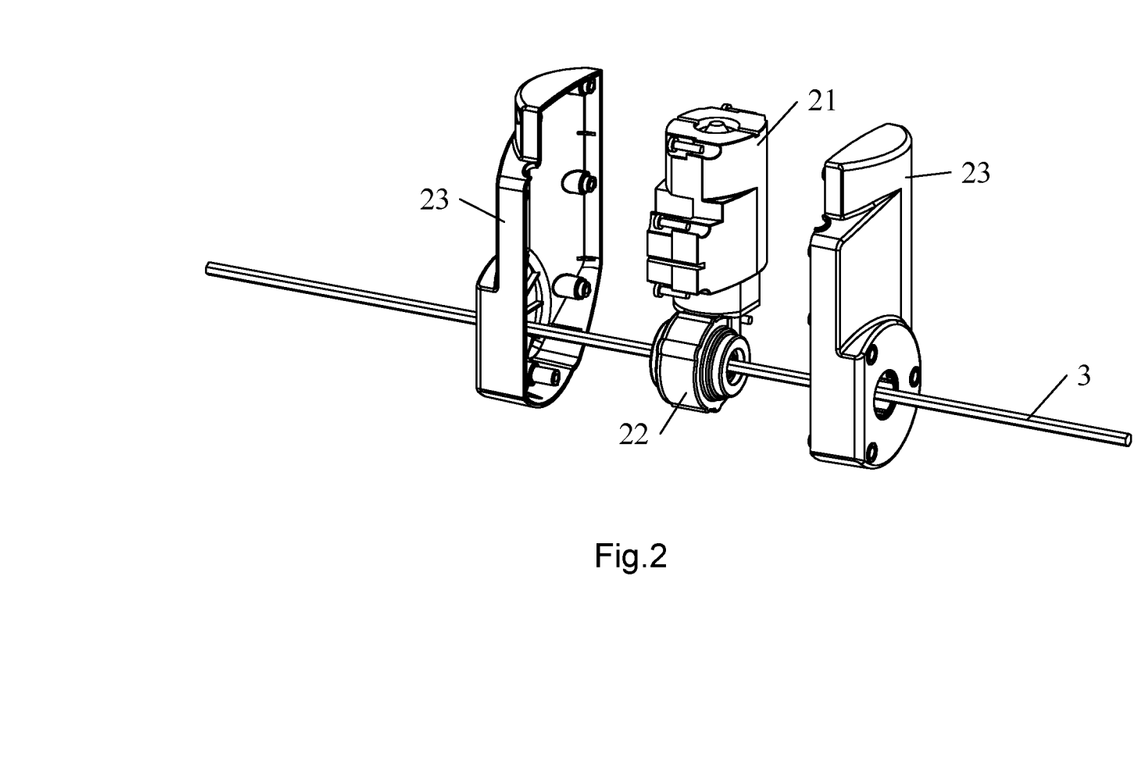
FIG. 2 is an exploded view of a driving device of the lifting device for headrest according to an embodiment of the present invention.

Referring to FIG. 2, the driving device 2 includes an electric motor 21 and a gear box 22. Specifically, driving force outputted from the electric motor 21 is transferred to the gear box 22 through which the driving rod 3 passes. For example, the driving rod 3 is fixed to a gear of the gear box 22, by which the driving rod 3 is driven by the gear box 22. Preferably, the driving rod 3 has a polygonal cross section, for example is a hexagonal cross section in this embodiment. Specifically, the driving device 2 further includes two housing parts 23 connected together to shield the electric motor 21 and the gear box 22, so as to protect the electric motor 21 and the gear box 22. Optionally, the driving device 2 can be other actuating devices besides the electric motor 21 and gear box 22, so as to drive the driving rod 3.

Figure 3:
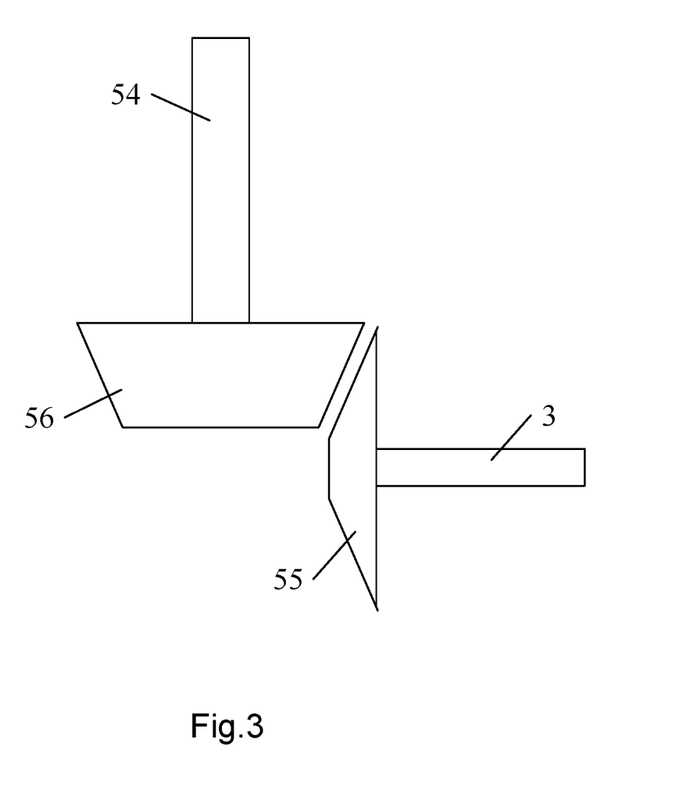
FIG. 3 is a schematic diagram showing the connection of the driving rod and the screw rod.
Figure 4:
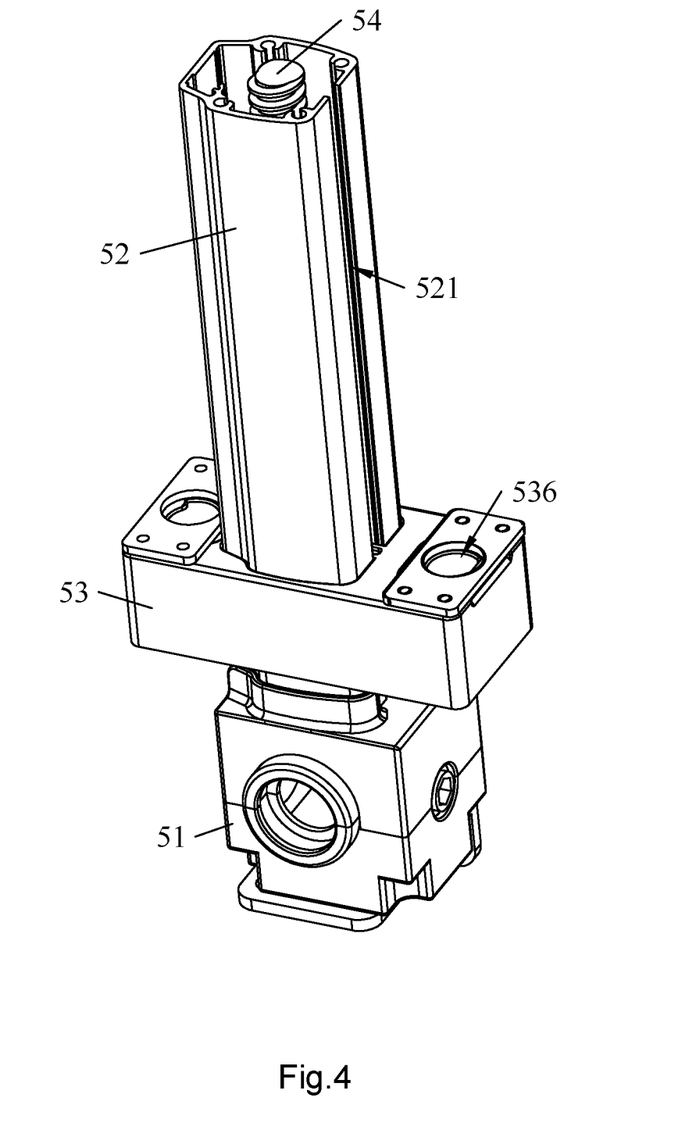
FIG. 4 is a perspective view of a guide rod and a slider of the lifting device for headrest according to an embodiment of the present invention.
Figure 5:
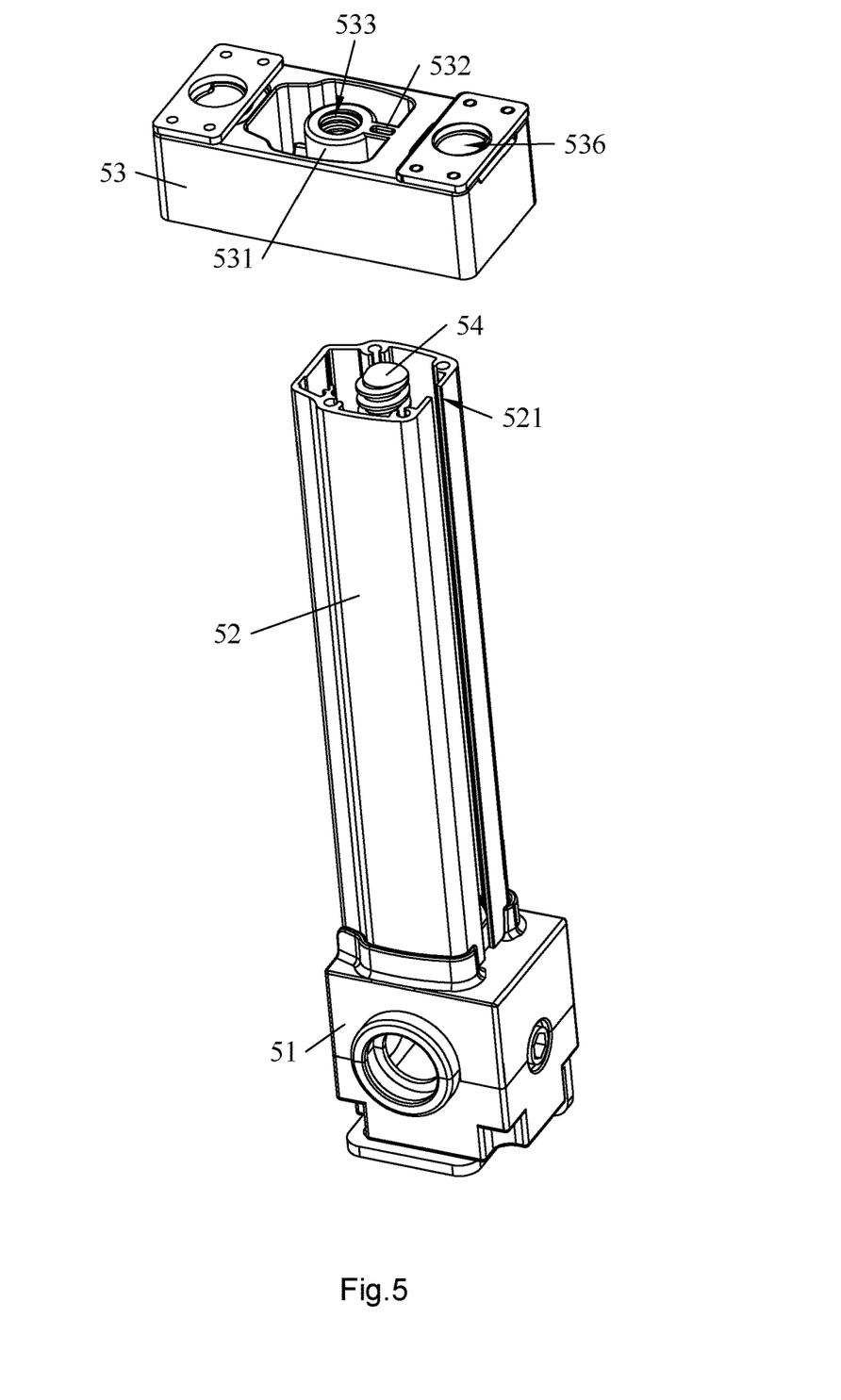
FIG. 5 is a schematic diagram showing that the slider is detached from the guide rod.

As illustrated in FIGS. 3 to 5, the reversing driving assembly includes a screw rod 54 positioned in the guide rod 52 and a gear group located in the shell 51, the screw rod 54 and the slider 53 are in a threaded connection. When the screw rod 54 is rotated, the slider 53 slides downwards; the gear group is connected between the driving rod 3 and the screw rod 54, so that the rotation of the driving rod 3 can be transferred to the screw rod 54. In this embodiment, the gear group includes two conical gears 55, 56 which are respectively fixed on the ends of the driving rod 3 and the screw rod 54. In such a way, driving force transfer can be achieved between the driving rod 3 and the screw rod 54 that are substantially perpendicular with each other. Optionally, the gear group can has other gears, and the amount of the gear is not limited. The reversing driving assembly can use other structures such as worms and gears to achieve the driving force transfer between the driving rod 3 and the screw rod 54.

Specifically, the guide rod 52 is a hollow structure, and the screw rod 54 is located in the guide rod 52 and extended along a direction parallel to the guide rod 52. Specifically, a long gap 521 parallel to the screw rod 54 is formed on a side wall of the guide rod 52. The slider 53 defines a cavity and has a receiving part 531 formed in the cavity, a connecting part 532 is connected between the receiving part 531 and the side wall of the cavity. Further, a screw hole 533 is formed on the receiving part 531 to match with the screw rod 54. Specifically, the slider 53 is movably connected on the guide rod 52, meanwhile the receiving part 531 is connected with the screw rod 54 so that the screw hole 533 and the screw rod 54 are in screw connection; additionally, the connecting part 532 is received in the long gap 521 and moves along the long gap 521. When the screw rod 54 rotates, the slider 53 can move up and down along the guide rod 52 by means of the screw connection of the screw rod 54 and the screw hole 533.

Figure 6:
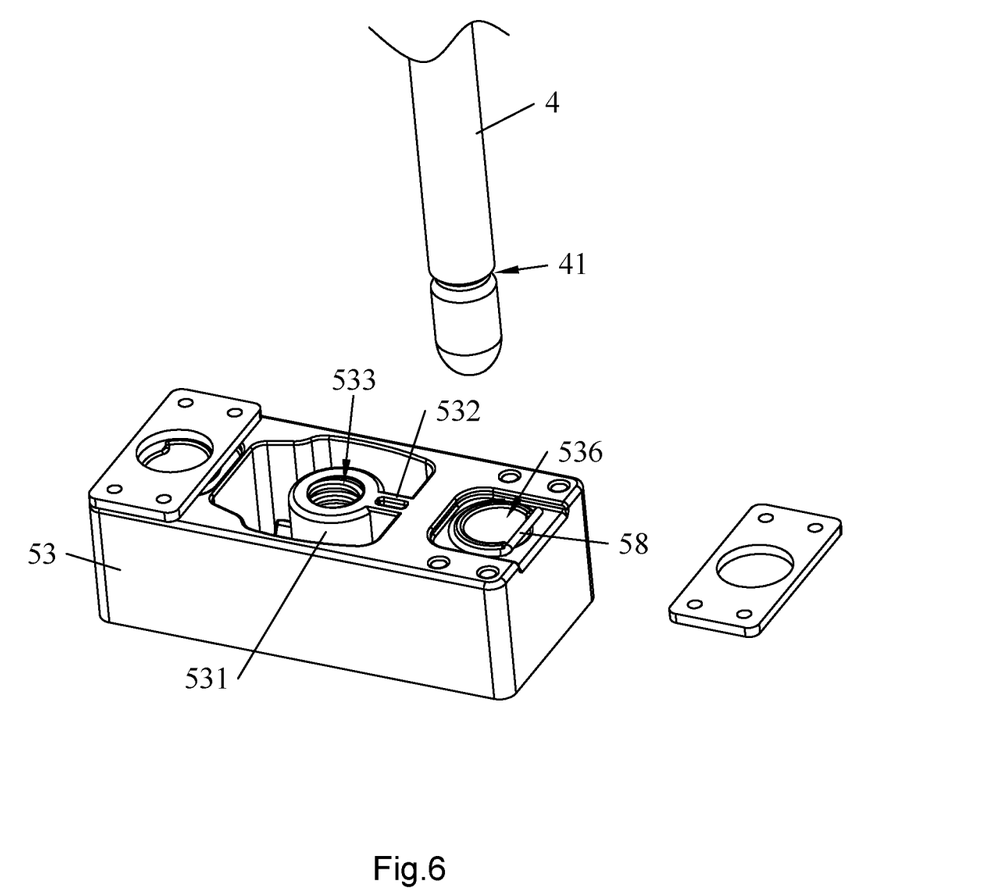
FIG. 6 is a schematic diagram showing a recess of the slider and a ring groove of the headrest support.

Referring to FIG. 6, an inserting slot 536 is provided on the slider 53, by which the lower end of the headrest support 4 is detachably inserted into the inserting slot 536. In actual installation, firstly the headrest supports 4 are fixed to the headrest, then the headrest supports 4 are inserted into the inserting slots 536 of the sliders 53, so that the headrest can be mounted on the lifting device for headrest of the present invention. Further, the slider 53 is provided with a spring 58 encircling the inserting slot 536, specifically, a curved arm of the spring 58 is positioned outside the inserting slot 536, while a straight arm of the spring 58 is across the inserting slot 536. Accordingly, a ring groove 41 is provided on the lower end of the headrest support 4, when the headrest support 4 is inserted into the inserting slot 536, the straight arm of the spring 58 is received into the ring groove 41, so that the connection between the headrest support 4 and the inserting slot 536 is more steady.

Optionally, the headrest can be mounted on the headrest supports 4 directly, but in this situation, only the height of the headrest, instead of the angle of the headrest can be adjusted. Therefore, in a preferable embodiment, a headrest hinge 6 is provided at the headrest support 4. Specifically, the headrest hinge 6 includes a fixing part 61 connected with the headrest support 4 and a swinging arm 62 connected with the fixing part 61. More specifically, the swinging arm 62 can be rotated or locked relatively to the fixing part 61, and the headrest is fixed on the swinging arm 62. In such a configuration of the headrest hinge 6, the angle of the headrest can be adjusted. Since the headrest hinge 6 is a common component, and its detailed structure is omitted here.

Figure 7:
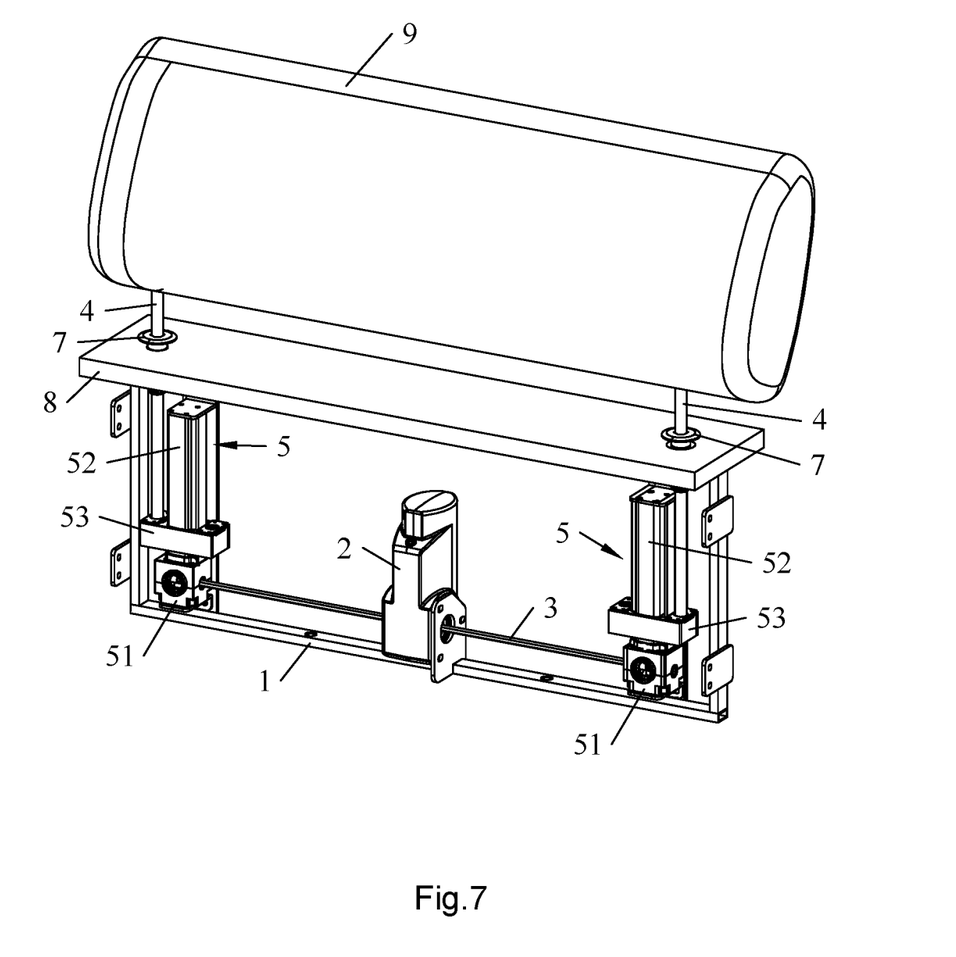
FIG. 7 is a schematic diagram showing that a headrest is mounted on the lifting device for headrest according to an embodiment of the present invention.

Referring to FIG. 7, the lifting device further includes two guide screw bushings 7 configured at two ends of the fixing frame 1 respectively. In actual installation, the fixing frame 1 is firstly fixed in the sofa body, and the two guide screw bushings 7 are screwed to press against the top plate 8 of the sofa frame, specifically, the guide screw bushing 7 is located right above the inserting slot 536 of the slider 53. And then, the headrest 9 is fixed on the headrest hinges 6, the two headrest supports 4 pass through the guide screw bushings 7 to insert into the inserting slots 536, in such a way, the installation is completed. During the sliding of the slider 53 and the headrest supports 4, the guide screw bushings 7 play a role of guiding, so that the movement of the headrest 9 can be more stable.

In the present invention, since the lifting mechanisms 5 are configured at two sides of the driving device 2, the driving rod 3 driven by the driving device 2 is connected with the reversing driving assembly, and the slider 53 installed with the headrest support 4 is movably connected on the guide rod 52, thus the driving force from the driving device 2 can be transferred to the reversing driving assembly by means of the driving rod 3, causing the slider 53 to slide up and down along the guide rod 52. Differing from the prior art that uses a driving rod to actuate two linkage assemblies, the lifting device for headrest in the present invention uses the driving rod 3 and the reversing driving assembly to transfer the driving force from the middle driving device 2 to the two lifting mechanisms 5, so that both sliders 53 on the two lifting mechanisms 5 can driving forces to improve the balance at both sides and make the support force stronger. Particularly, the two sliders 53 at two sides can maintain the same movement even if the loading forces at two sides of the headrest are different, that is, the headrest is kept in a stable status, thereby preventing damage of the lifting device and the sofa.

While the invention has been described in connection with what are presently considered to be the most practical and preferred embodiments, it is to be understood that the invention is not to be limited to the disclosed embodiments, but on the contrary, is intended to cover various modifications and equivalent arrangements included within the spirit and scope of the invention.

What is claimed is:

1. A lifting device for headrest, comprising a fixing frame, a driving rod, two headrest supports, a driving device fixed on the fixing frame, and two lifting mechanisms configured on the fixing frame and located at two sides of the driving device, wherein each lifting device comprises a reversing driving assembly, a guide rod and a slider moveably connected on the guide rod, the two headrest supports are mounted on the sliders, respectively, the driving rod passes through the driving device and is driven by the driving device, two ends of the driving rod are connected with the reversing driving assemblies, respectively, and the slider is driven by the reversing driving assembly to slide on the guide rod.

2. The lifting device for headrest according to claim 1, wherein the driving device comprises an electric motor and a gear box, and the driving rod passes through the gear box and is connected with the gear box.

3. The lifting device for headrest according to claim 1, wherein a cross section of the driving rod is polygonal.

4. The lifting device for headrest according to claim 1, wherein the lifting mechanism further comprises a shell fixed on the fixing frame, the guide rod is fixed on the shell, the reversing driving assembly is configured in the shell and the guide rod, and an end of the driving rod is inserted into the shell.

5. The lifting device for headrest according to claim 1, wherein the reversing driving assembly comprises a screw rod positioned in the guide rod and a gear group connected between the driving rod and the screw rod, and the slider is connected with the screw rod.

6. The lifting device for headrest according to claim 5, wherein the gear group comprises two conical gears engaging with each other, and the two conical gears are fixed to the driving rod and the screw rod respectively.

7. The lifting device for headrest according to claim 1, wherein an inserting slot is provided on the slider, by which a lower end of the headrest support is detachably inserted into the inserting slot.

8. The lifting device for headrest according to claim 7, wherein a ring groove is provided on the lower end of the headrest support, and a spring is provided at the slider and received in the ring groove.

9. The lifting device for headrest according to claim 1, further comprising two guide screw bushings configured at two ends of the fixing frame respectively, and the two headrest supports passes through the two guide screw bushings.

10. The lifting device for headrest according to claim 1, wherein a headrest hinge is fixed on the headrest support, and the headrest hinge comprises a fixing part connected with the headrest support and a swinging arm connected with the fixing part.

* * * * *